UNITED STATES PATENT OFFICE.

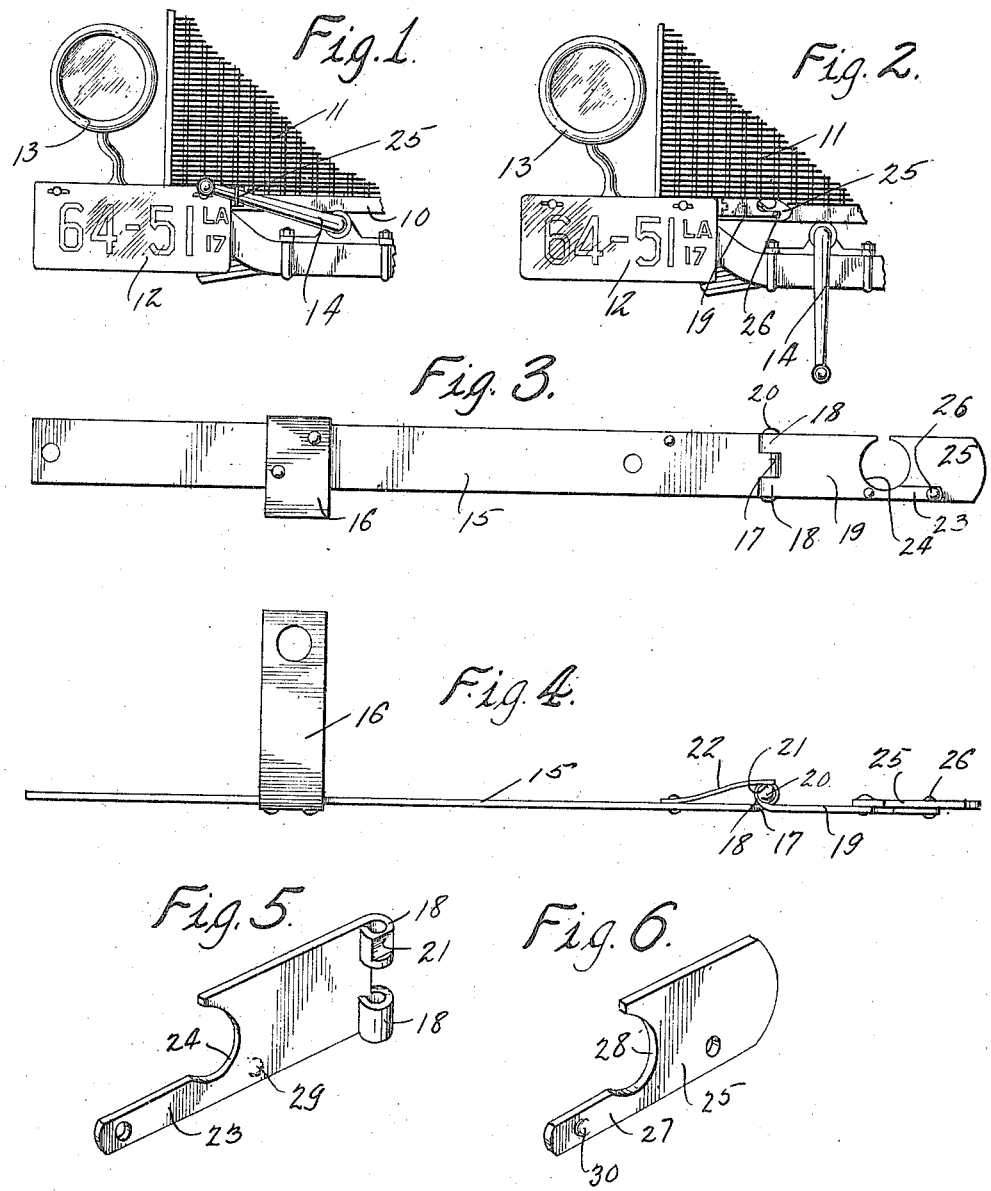

ANDREW J. GWIN, OF WINNFIELD, LOUISIANA, ASSIGNOR OF ONE-HALF TO ANNIE F. GWIN, OF WINNFIELD, LOUISIANA.

CRANK-HOLDER FOR AUTOMOBILES.

1,270,513.  Specification of Letters Patent.  Patented June 25, 1918.

Application filed September 14, 1917. Serial No. 191,381.

*To all whom it may concern:*

Be it known that I, ANDREW J. GWIN, a citizen of the United States, residing at Winnfield, in the parish of Winn, State of Louisiana, have invented certain new and useful Improvements in Crank-Holders for Automobiles; and I do hereby declare the following to be a full, clear, and exact description of the invention, such as will enable others skilled in the art to which it appertains to make and use the same.

This invention is an improvement in automobile attachments and has particular reference to a crank holder.

An object of the invention is to provide a holder or support for the crank employed to start automobile engines whereby the crank may be retained in such position, when not in use, that the clutch members of the crank shaft will remain disengaged thus eliminating the necessity of using a spring to hold said crank and said clutch members in their inoperative positions.

Another object is to provide a holder of simple and inexpensive structure and preferably adapted for attachment to a license plate carried in the front of an automobile.

The inventive idea involved is capable of receiving a variety of mechanical expressions one of which, for the pupose of illustrating the invention, is shown in the accompanying drawing, wherein:—

Figure 1 is a fragmentary front elevation of an automobile showing the holder attached thereto and in operative position.

Fig. 2 is a similar view showing the holder in inoperative position.

Fig. 3 is an enlarged front elevation of the holder detached.

Fig. 4 is a top plan view.

Fig. 5 is a perspective view of one of the locking members for the crank handle.

Fig. 6 is a similar view of the other locking member.

In the drawing the numeral 10 indicates a portion of the frame of an automobile having a radiator 11 mounted thereon to which a license plate 12 is secured beneath one of the lamps 13 of a vehicle. The usual crank handle 14 is employed for cranking the engine of the automobile and it is for the purpose of retaining this handle 14 in its inoperative position, as shown in Fig. 1, that the present invention is designed.

The holder which comprises the essential feature of the invention is preferably attached to the back of the license plate 12 longitudinally of and adjacent the upper end thereof. The holder preferably comprises a supporting arm 15 secured to the back of the license plate and having one end terminating adjacent one of the vertical edges of said plate, the intermediate portion of said arm having an angular bracket 16 which may be secured to an adjacent support for further retaining the holder in position. Said end of the arm 15 is reduced to provide a hinge bearing 17 each side of which is engaged by a bearing 18 formed by bifurcating one end of the locking member 19 which is hinged to the arm 15 by the pintle 20 engaging said bearings 17 and 18 so that said locking member will swing about a vertical axis. The movement of the member 19 to its operative position, as shown in Fig. 1, is limited by the engagement of said member with the adjacent end of said arm so that said member will be in a position substantially at right angles to the arm. In order to yieldably retain the member 19 in its inoperative position as shown in Fig. 2, the upper bearing 18 is flattened as indicated at 21 and adapted to be engaged by the free end of the leaf spring 22 the other end of which is secured to the arm 15. This spring will prevent any accidental movement of the member 19 but it will be apparent that when sufficient outward pressure is exerted upon said member the tension of the spring may be overcome. The free end of the locking member 19 is reduced to provide an extension 23 and is also curved as indicated at 24 to provide a portion of a socket or opening for retaining the handle 14.

A second locking member 25 is adjustable relative to the member 19 and pivoted thereto as indicated at 26 to permit of an adjustment of the member 25 in a vertical plane. The inner end of said member 25 is also provided with a reduced extension 27 and a curved portion 28 which coöperates with the curved portion 24 to complete the socket or opening for receiving the handle 14. In order to retain the locking members 19 and 25 in their operative positions so as to prevent accidental detachment of the handle 14, the member 19 is provided at a point adjacent the inner end of the extension 23 thereof with a projection or nib 29 adapted to engage a depression or recess 30 formed in the outer end of the extension 27 of the member 25. By means of this projection and recess it will be apparent that the members will be frictionally held in operative position. In practice, when the holder is in its inoperative position as shown in Fig. 2 and after the engine has been cranked, the locking members are swung to the position shown in Fig. 1 and the crank raised so that the portions thereof will engage the curved portion of the locking member 25. Said member is then swung about its pivot until the recess 30 therein engages the projection 29 of the member 19 whereupon the handle 14 will be effectively retained in the opening formed by the curved portions 24 and 28 and thus be prevented from becoming accidentally detached. In order to release the handle the locking member 25 is swung about its pivot to a position which will permit of the disengagement of said handle therefrom.

What is claimed is:—

1. A crank holder for automobiles comprising a supporting arm mounted adjacent the crank handle of the engine, a locking member pivoted to said arm and disposed in alinement therewith when in inoperative position, a second locking member pivoted to the first named locking member and coöperating therewith to form an opening for receiving said crank handle, and yieldable means carried by said arm and engaging a portion of the first named locking member for yieldably retaining the same in inoperative position.

2. A crank holder for automobiles comprising a supporting arm mounted adjacent the crank handle of the engine, a locking member hinged to said arm and adapted to swing about a vertical axis, the free end of said member being reduced to provide an extension and also being curved to form a portion of a handle receiving opening, a second locking member pivoted to the extension of the first named locking member and also provided with a reduced extension and a curved portion coöperative with the first named curved portion to complete said opening when said locking members are in their operative position, means frictionally retaining said members in operative position, and a spring carried by said arm and engaging one of said locking members for yieldably retaining the same in inoperative position.

In testimony whereof, I affix my signature in the presence of two witnesses.

ANDREW J. GWIN.

Witnesses:
L. A. DE BADY,
R. M. BRILY.

Copies of this patent may be obtained for five cents each, by addressing the "Commissioner of Patents, Washington, D. C."